(12) United States Patent
D'Ercoli et al.

(10) Patent No.: US 11,969,898 B2
(45) Date of Patent: Apr. 30, 2024

(54) MULTI-SENSOR OPTIMIZATION OF AUTOMATIC MACHINES TO PREVENT SAFETY ISSUES

(71) Applicant: Datalogic IP Tech S.r.l., Calderara di Reno (IT)

(72) Inventors: Francesco D'Ercoli, Bologna (IT); Marco Cumoli, Monte San Pietro (IT); Claudio Saporetti, Bologna (IT)

(73) Assignee: DATALOGIC IP TECH S.R.L., Calderara di Reno (IT)

( * ) Notice: Subject to any disclaimer, the term of this patent is extended or adjusted under 35 U.S.C. 154(b) by 0 days.

(21) Appl. No.: 16/222,244

(22) Filed: Dec. 17, 2018

(65) Prior Publication Data

US 2020/0189103 A1 Jun. 18, 2020

(51) Int. Cl.
*B25J 9/16* (2006.01)
*G05B 19/406* (2006.01)
*G06N 5/022* (2023.01)

(52) U.S. Cl.
CPC .......... *B25J 9/1666* (2013.01); *G05B 19/406* (2013.01); *G06N 5/022* (2013.01); *G05B 2219/50193* (2013.01)

(58) Field of Classification Search
CPC .................. B25J 9/1666; G05B 19/406; G05B 2219/50193; G06N 5/22
See application file for complete search history.

(56) References Cited

U.S. PATENT DOCUMENTS

| | | | |
|---|---|---|---|
| 5,952,796 A | 9/1999 | Colgate et al. | |
| 7,742,641 B2 | 6/2010 | Ivanov et al. | |
| 8,249,747 B2 | 8/2012 | Kock | |
| 9,043,025 B2 | 5/2015 | Brooks et al. | |
| 10,325,485 B1* | 6/2019 | Schuster | G01S 7/497 |
| 2011/0264266 A1* | 10/2011 | Kock | B25J 9/1676 |
| | | | 700/255 |
| 2014/0067121 A1* | 3/2014 | Brooks | B25J 9/1676 |
| | | | 700/255 |
| 2016/0354927 A1* | 12/2016 | Kikkeri | G06T 1/0014 |
| 2017/0087722 A1* | 3/2017 | Aberg | B25J 9/1676 |
| 2017/0144307 A1* | 5/2017 | Rublee | B25J 9/1676 |
| 2017/0190051 A1* | 7/2017 | O'Sullivan | G06N 20/00 |

(Continued)

OTHER PUBLICATIONS

A Detailed Review of Feature Extraction in Image Processing Systems, (2014), http://ieeexplore.ieee.org/documents6783417/, 4 pages.

(Continued)

*Primary Examiner* — Jaime Figueroa
*Assistant Examiner* — Zachary Joseph Wallace
(74) *Attorney, Agent, or Firm* — Foley & Lardner LLP

(57) ABSTRACT

A predictive system and process that predicts safety system activation in industrial environments when collaborative robots (COBOTs), automated guidance vehicles (AGVs), and other robots (individual or collectively "robots") are interacting (i) between one another or (ii) between a robot and human. As provided herein, the predictive system is not meant to substitute traditional safety systems, but rather to detect and classify robot-to-robot and robot-to-human interactions and potential interactions thereof so as to limit or avoid those interactions altogether, thereby increasing safety and efficiency of the robots.

19 Claims, 7 Drawing Sheets

(56) References Cited

U.S. PATENT DOCUMENTS

| | | |
|---|---|---|
| 2019/0030721 A1* | 1/2019 | Hoshiyama ............ B25J 9/1697 |
| 2019/0143517 A1* | 5/2019 | Yang .................... G06N 3/0454 |
| | | 700/245 |
| 2020/0122330 A1* | 4/2020 | Chen ...................... B25J 9/1694 |

OTHER PUBLICATIONS

About "ensemble learning" (2009), http;://www.scholarpedia.org/article/Ensemble_learning, 20 pages.

* cited by examiner

Naïve Bayes Reference Formual
500

$$P(y \mid x_1, \ldots, x_n) = \frac{P(y)P(x_1, \ldots, x_n \mid y)}{P(x_1, \ldots, x_n)}$$

- class posterior probability
- class prior probability
- likelihood
- attribute prior probability $$P(x_i \mid y, x_1, \ldots, x_{i-1}, x_{i+1}, \ldots, x_n) = P(x_i \mid y).$$

$$P(y \mid x_1, \ldots, x_n) = \frac{P(y)\prod_{i=1}^{n} P(x_i \mid y)}{P(x_1, \ldots, x_n)}$$

$$P(y \mid x_1, \ldots, x_n) \propto P(y)\prod_{i=1}^{n} P(x_i \mid y)$$

$$\Downarrow$$

$$\hat{y} = \arg\max_{y} P(y)\prod_{i=1}^{n} P(x_i \mid y),$$

FIG. 5

MULTI-SENSOR OPTIMIZATION OF AUTOMATIC MACHINES TO PREVENT SAFETY ISSUES

BACKGROUND

Robots have become widely used in a variety of different areas of society. One area of heavy robot usage has become modern factories, where a variety of different kinds of robots are used. Classic industrial robots are designed to work very quickly and carry high loads, but generally require dedicated spaces and protections to guarantee human safety. These industrial robots often work in parallel with humans, but generally do not interact with humans.

In recent years "collaborative robots" or COBOTs have been increasingly used. COBOTs are designed to interact with humans in a shared workspace. COBOTs usually guarantee safety by reducing the chances of mechanical collision between one another and with a human being by using communications and sensors. Movements of COBOTs are usually very slow, move very small masses or perform other tasks (e.g., cleaning floors), and are often covered by a soft skin. Several Cobot models are already available on the market a variety of from manufacturers, such as FANUC, KUKA, Yaskawa, Universal Robots, Rethink Robotics, and COMAU.

Both conventional robots and COBOTs are supervised by safety graded sensors and control systems. In most cases, safety systems are programmed to be very sensitive and very drastic in that responsive to a potential collision, the safety systems completely stop the device or, in best cases, strongly or significantly reduce speed of the COBOTs. The problem with such a programmed control system is that despite the safety measures, the efficiency of movement of the COBOTs is dramatically reduced as a result of having to carry reduced loads, limiting speed, and stopping or strongly slowing movement when encountering other COBOTs or humans. As a result, there is a need to create a system in which the efficiency of the COBOTs is increased or maximized so that productivity of the COBOTs is improved.

SUMMARY

To overcome the inefficiencies of existing COBOTs, the principles provided herein include a predictive system and process that predicts safety system activation in industrial environments when collaborative robots (COBOTs), automated guidance vehicles (AGVs), and other robots (individual or collectively "robots") are interacting (i) between one another or (ii) between a robot and human. As provided herein, the predictive system is not meant to substitute traditional safety systems, but rather to detect and classify robot-to-robot and robot-to-human interactions and potential interactions thereof so as to limit or avoid those interactions altogether. The prediction of the interactions, which result in risky situations, may be used to avoid those situations by a proper robot control (e.g., modified guidance) and/or with proper alerts (e.g., audio and/or visual) to the operator.

In an embodiment, the predictive system may use a distributed vision system capable of modeling and interpreting, in a real time fashion (e.g., by means of 2D and 3D camera), the interactions and potential interactions between robots and between robots and humans that may be used as safety system activation predictors. The vision system may include non-optical components, including LIDAR, radar, ultrasonic sensors, pressure-sensitive mats, light curtains, or even simple photocells. Interaction predictors proposed by multiple machine learning models configured to operate on the same or different input data types (e.g., 2D, 3D, and/or IR images) may be input to an ensemble machine learning model together with a status of activation of the safety system. The multichannel vision system may also enhance safety even if there is a lack of existing physical sensors to control or limit interactions between (i) robots and humans (e.g., touch sensors capable of detecting forces and accelerations) or (ii) robots and robots (e.g., proximity sensors) by monitoring location of robots with respect to one another and with respect to humans by using vision or other sensory type that supplements existing physical sensors.

An embodiment of a system for safely operating robots in an environment may include a set of heterogeneous input sensors configured to generate sensed data inclusive of humans and robots operating within the environment. One or more safety systems may be configured to slow or stop the robots in the event of detecting a potential interaction with another robot or human. At least one processor may be in communication with the input sensors, and be configured to determine a probability that a safety system will activate as a function of the sensed data. The processor(s) may generate an output signal to cause at least one of a notification to alert a human or a control command to alter planned movement of a robot. The system may increase safety and efficiency of operations of the robots.

One embodiment of a process for safely operating robots in an environment may include receiving sensed data from a set of heterogeneous sensors in the environment inclusive of humans and robots operating within the environment. The robots may be slowed or stopped in the event of detecting a potential interaction with another robot or human. A probability that a safety system will activate as a function of the received sensed data may be determined, and an output signal to cause at least one of a notification to alert a human or a control command to alter planned movement of a robot may be generated. The process may, therefore, increase safety and efficiency of operations of the robots.

BRIEF DESCRIPTION OF THE DRAWINGS

Illustrative embodiments of the present invention are described in detail below with reference to the attached drawing figures, which are incorporated by reference herein and wherein:

FIG. 5 is a listing of Naïve Bayes reference formulas used for performing predictive analysis.

DETAILED DESCRIPTION OF THE DRAWINGS

Figure 1A:
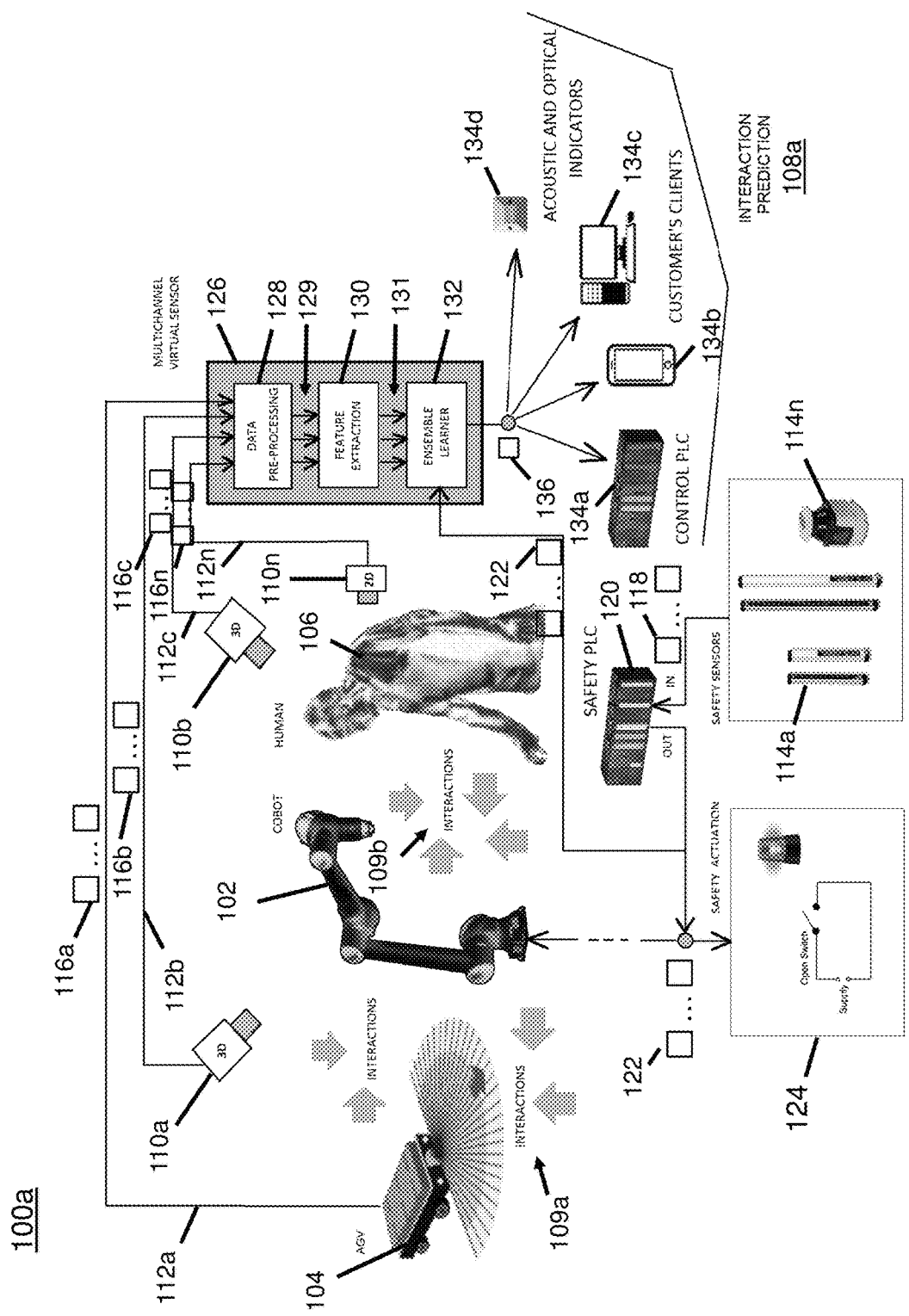
FIG. 1A is an illustration of an illustrative environment in which robots and/or automated guidance vehicles (AGVs) may operate and interact with humans and robots and within which a multi-channel virtual sensor and an interaction prediction controller operate to predict interactions between the robots and/or humans to reduce collision risk in accordance with the principles described herein.

With regard to FIG. 1A, an illustration of an illustrative environment 100*a* in which one or more robots 102 and/or one or more automated guidance vehicles (AGVs) 104 may operate and interact with humans 106, other AGVs, and/or other robots and within which an interaction prediction system 108*a* for predicting interactions 109*a* and 109*b* (collectively 109), for example, between the robots 102, AGVs 104, and/or humans 106 may be utilized to reduce collision risk and increase productivity in accordance with the principles described herein. A multi-channel vision system may be provided by utilizing multiple surveillance or other cameras 110*a*-110*n* (collectively 110), which may include two-dimensional (2D), three-dimensional (3D), or other camera type (e.g., IR camera). The use of a multi-channel vision system with multiple cameras 110 may overcome a possible lack of physical sensors (e.g., touch sensors capable of detecting forces and accelerations) to control interaction between robots and humans or robots and robots. Irrespective of the sensor or camera types, communication paths 112*a*-112*n* (collectively 112) may provide for captured data 114*a*-114*n* (collectively 114) to be communicated from the cameras 110 for processing and predictive analysis. It should be understood that the captured data 114 may be in a wide range of formats based on the cameras 110 used to capture the images and data formats produced thereby.

In addition to the surveillance cameras 110, safety sensors 116*a*-116*n* (collectively 116) may be operating within the environment 100*a* and used as safety measures to limit injury to humans or objects within the area. The sensors 116, which may be fixedly positioned or positioned on moveable objects, including AGVs and robots, may detect if a human or object (e.g., pallet, robot, vehicle, etc.) moves within a region when the robot 102 or other equipment is operating, and generate sensor signals 118. The sensor signals 118 may be communicated to a safety programmable logic controller (PLC) 120 that controls operation of one or more robot(s) as a function of the sensor signals 118. For example, in the event of detecting that a human, robot, or object enters an environment in which the robot 102, which may be stationary or mobile, is operating, the safety PLC 120 may output command data 122 to the robot 102 to slow or stop operation thereof so as to avoid a collision. Additionally and/or alternatively, the command data 122 may be communicated to one or more safety devices 124, such as a gate, siren, alarm, illumination device, etc., to notify users within the area that a safety issue exists by the user being in the area when a robot is in operation.

As provided herein, different types of cameras 110 and sensors 116, including those of existing surveillance systems, may be utilized by the interaction prediction system 108*a* for improving the efficiency of robots 102 and AGVs in the environment 100*a*. A multi-channel virtual sensor 126 that is adapted or configured to receive and process signals 114 and 122 to predict probability of a safety system activation may be utilized. The multi-channel virtual sensor 126 may be configured to include a data pre-processing module 128, feature extraction module 130, and ensemble learner module 132. The modules 128, 130, and 132 may be executed on the same or different processors, as further described herein.

The data pre-processing module 128 may include or be formed of multiple pre-processors that are configured to process disparate image data received from distributed cameras (e.g., 2D camera 110*n* and 3D cameras 110*a* and 110*b*). The feature extraction module 130 may receive processed image data 129 from the data pre-processing module 128, and be configured to extract features (e.g., edges or corners objects identified in the processed image data 129) therefrom. As with the data pre-processing module 128, the feature extraction module 130 may have multiple feature extractors or machine learning models that are configured to process disparate types of image data. The feature extraction module 130 may be configured to generate feature data or interaction predictors 131 from multiple machine learning models that are input to an ensemble machine learning model 132 along with a status of activation of the safety system from the safety PLC 120. The ensemble machine learner module 132 may be configured to receive the feature data 131 from the feature extraction module 130 (e.g., probabilities) and from the safety PLC 120 (e.g., Boolean or binary data) so as to classify robot-to-robot and robot-to-human interactions to detect in advance risky situations and avoid the risky situations by altering robot control (e.g., changing a trajectory) or operator alert (e.g., audible notice).

In an embodiment, the multi-channel virtual sensor 126 may communicate with a control PLC 134*a*, client communications devices 134*b* and 134*c*, and/or acoustic and optical indicators 134*d* (collectively 134). Communication by the multi-channel virtual sensor 126 may include communicating data 136 (e.g., control data, informational data, classification data, etc.) to any or all of the control PLC 134*a* to control current or future operation of the robot 102 or AGV 104, communications devices 134*b* and 134*c*, and/or acoustic and optical indicators 134*d* to notify the human 106 of an interaction probability. By using the multi-channel virtual sensor 126, which may have a wide range of configurations (see, for example, FIG. 1B), the ability to avoid a potential interaction so as to avoid the safety system (e.g., safety PLC 120) from having to take a safety action (e.g., slow or stop the robot 102 or AGV 104), the robot 102 and AGV 104 may operate more efficiently. As a result, an operator may be able to increase speed and/or load of the robot 102 and/or AGV 104.

Figure 1B:
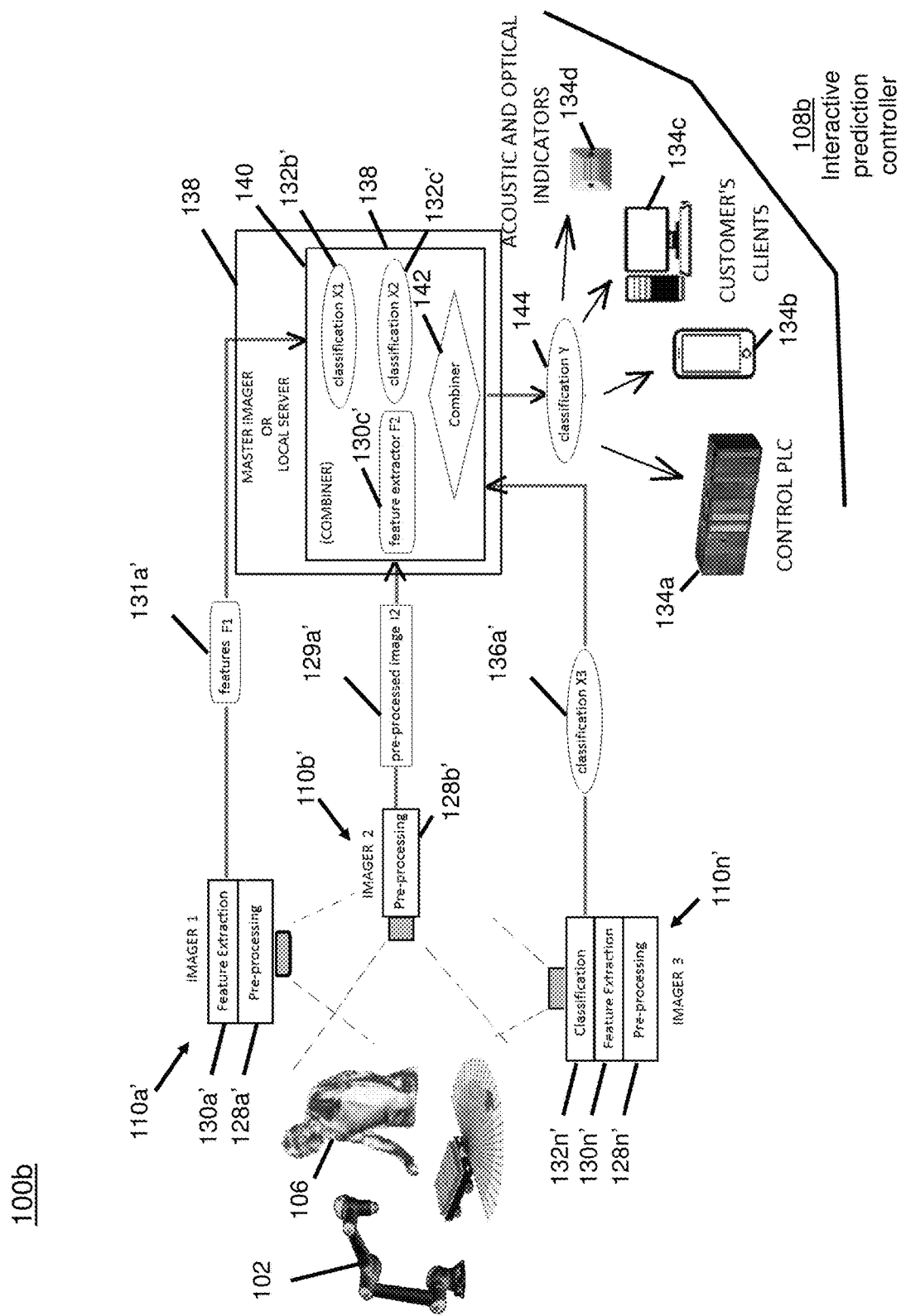
FIG. 1B is an illustration of an alternative environment in which an alternative multi-channel virtual sensor and an interaction prediction controller may be used for predicting interactions between the robots and/or humans.

With regard to FIG. 1B, an illustration of an alternative environment 100*b* in which an interaction prediction controller 108*b* may be used for predicting interactions between the robots 102 and/or humans is shown. As previously described, the multi-channel virtual sensor 126 of FIG. 1A is modular, and the intrinsic parallelism of the processes described herein enables different modules to be deployed and executed on different physical devices (e.g., imagers, PC-based servers, etc.). As shown, multiple imagers 110*a*'-110*n*' (collectively 110') may be used to capture images, but each may also be configured to perform additional post-image capture functions. In one embodiment, imager 110*a*', which may be a 3D camera, may be configured with (i) an image pre-processor 128*a*' to perform embedded image pre-processing and (ii) a feature extraction module 130*a*' for extracting features from pre-processed image data produced by the image pre-processor 128*a*'. Similarly, imager 110*b*' may be configured with an image pre-processor 128*b*'. Imager 110*n*' may be configured with each of a pre-processor 128*n*', feature extraction module 130*n*', and classification module 132*n*'. In other words, the multi-channel virtual sensor may be modular and distributed in surveillance equipment or dedicated equipment, such as shown in FIG. 1A.

As a result of the imagers 110' having post-image captured functions, data output from the imagers 110 may be different. As shown, feature data 131a' may be output from the feature extractor 130a' of imager 110a', pre-processed image data 129a' may be output from the pre-processor 128b' of imager 110b', and classification data 136a' may be output from the classification module 132n' of imager 110n'. Master imager or local server 138 may include a processor 140 that executes portions of the virtual sensor including one or more feature extractor modules 130c', classification modules 132b' and 132c', and combiner module 142. The combiner module 142, which may be configured to combine multiple interaction probabilities or classifications produced by the classifier modules 132a'-132n', may output a combined classification and/or other data 144, as previously described, for communicating to any of the control PLC 134a, client communications devices 134b and 134c, and/or acoustic and optical indicators 134d. It should be understood that other embodiments are possible depending on available computational and network resources. By utilizing distributed portions of the virtual sensor, the ability to perform real-time processing of safety system activation may be increased. It should be understood that consideration of the virtual sensor, such as shown in FIG. 1A, also allows for real-time processing.

Figure 2:
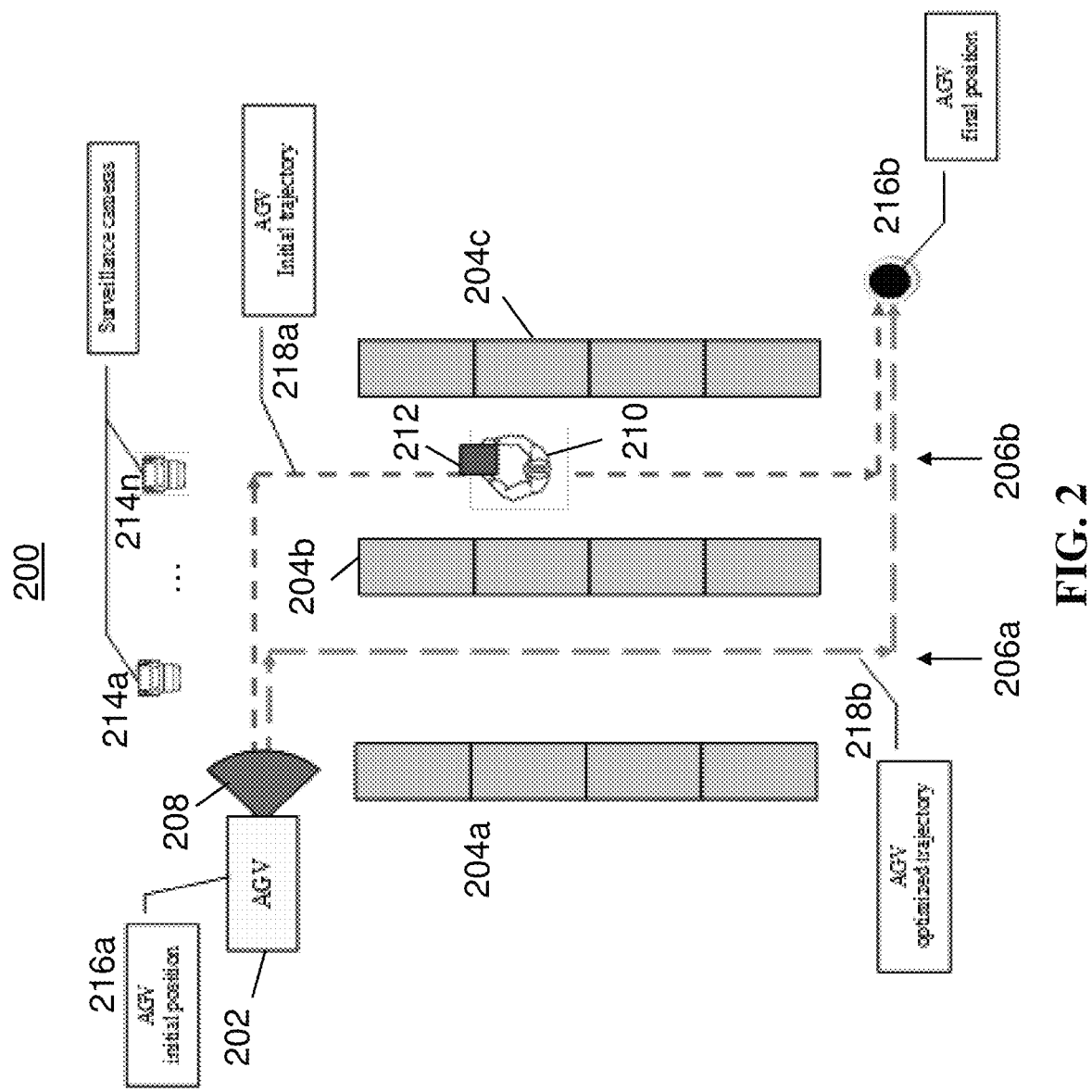
FIG. 2 is an illustration of an illustrative environment in which an automated guidance vehicle is shown to be operating, and an interaction prediction controller (see FIG. 3, for example) may be used to reduce risk of collision by the AGV with humans and/or other AGVs and increase efficiency of operation of the AGV.

With regard to FIG. 2, an illustration of an illustrative environment 200 in which an automated guidance vehicle 202 is shown to be operating, and an interaction prediction controller (see FIG. 3, for example) may be used to reduce risk of collision by the AGV 202 with humans and/or other AGVs and increase efficiency of operation of the AGV 202 is shown. The AGV 202 is shown to move between shelves 204a-204c (collectively 204) and along aisles 206a and 206b between the shelves 204. The AGV 202 may include a laser scanner that scans within a scanning region 208 to detect objects as part of its safety system for reducing or eliminating risk of collision by the AGV 202. However, if the AGV 202 approaches a human or object to the point of being within the scanning region 208, the AGV 202 will stop or significantly slow down, thereby impacting efficiency of movement. It should be understood that alternative and/or additional means of object sensing may be utilized. In this instance, a human 210 is shown to be working in aisle 206b with an object 212. The human 210 and/or object 212 that the human may be carrying or positioning may present an obstacle for the AGV 202 in moving through the aisle 206b, which would cause the AGV 202 to slow or stop until the obstacle is moved.

In accordance with the principles described herein, surveillance cameras 214a and 214b (collectively 214) may be positioned to capture images of the aisles 206a and 206b. The images may be still images or video images, which is a sequence of still images, and be stored in any data format, as understood in the art. In an embodiment, the surveillance cameras 214 may be configured to operate continuously, periodically, and/or aperiodically (e.g., in the event of motion being sensed). For example, image data may be captured in the form of video footage, in the form of still images every 1 second, or in response to a motion sensor identifying motion in the image frame.

Image data produced by the cameras 214 may be used by the interactive prediction controller to identify location of humans and/or objects, which may include other AGVs. It should be understood that additional surveillance equipment (e.g., structured light and time-of-flight sensors) may be utilized for image ranging (e.g., to produce 2D images with distance from a specific point in the scene) in addition to or as an alternative to the cameras 214. It should also be understood that the cameras 214 may be 2D cameras, 3D cameras, or any other type of optical or spectral camera, as understood in the art. It should also be understood that the AGV 202 may be equipped with one or more surveillance cameras or laser scanners capable of producing a 3D point cloud, thereby being able to capture and provide images to the multi-channel virtual sensor, as well.

In operation, the AGV 202 is shown to have an initial position 216a and being self or remotely guided to a final position 216b. In a conventional system, a pre-planned trajectory 218a would be given to the AGV 202 to follow irrespective of whether any humans or objects were located along the pre-planned trajectory. The problem is that if the human 210 and/or object 212 were located along the aisle 206b, as shown, then the AGV 202 would reach the object 212 and stop or significantly slow down. Until the object 212 were moved, the AGV 202 would sense the object 212 in the sense region 208 and wait until the object 212 is moved prior to completing movement along the trajectory 218a between the initial position 216a and final position 216b.

In accordance with the principles provided herein, the interaction protection system would identify that the human 210 and object 212 were along the initial trajectory 218a within aisle 206b, and notify the human 210 using an audible and/or visual indicator that the AGV 202 is approaching and will be traversing along the aisle 206b so that the human 210 is both safe and will avoid impeding the movement of the AGV 202. In an alternative embodiment, the interactive protection system may determine an optimized trajectory 218b for the AGV 202 to follow as a result of determining that the human 210 and/or object 212 would cause the AGV 202 to slow down or stop in the aisle 206b if the AGV were to follow the initial trajectory 208a to the final position 216b. In terms of determining an optimal trajectory for the AGV 202, deterministic algorithms may be used to analyze the image data captured by the cameras 214. In alternative embodiments, optimization is less obvious and may be better approached using machine learning models, such as the those described hereinbelow.

Figure 3:
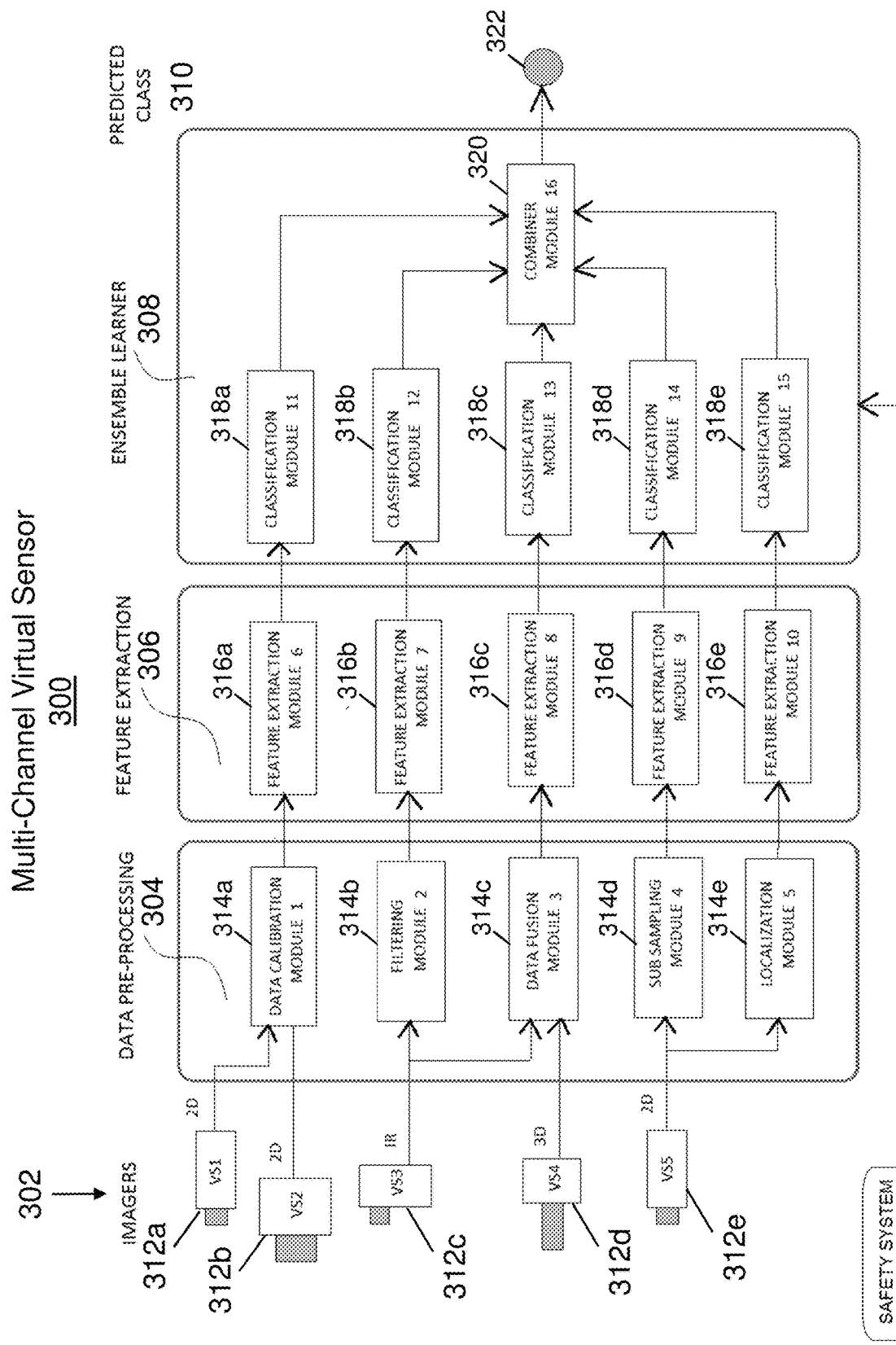
FIG. 3 is a block diagram of an illustrative multi-channel virtual sensor in accordance with the principles described herein.

With regard to FIG. 3, a block diagram of an illustrative multi-channel virtual sensor 300 in accordance with the principles described herein is shown. The virtual sensor 300 is shown to be in communication with a multi-channel vision system 302, and have stacked modules, including a data pre-processing module 304, feature extraction module 306, and ensemble learner module 308. Output from the ensemble learner module 308 may be a predicted class 310, for example.

Imagers

The multi-channel vision system 302 may include imagers 312a-312e (collectively 312) that may be configured to capture images in the same or different formats. For example, imagers 312a, 312b, and 312e may capture 2D images, imager 312c may capture infrared (IR) images, both reflected (near IR) and emitted IR (thermal-IR) images, and imager 312d may be configured to capture 3D images.

By the vision system providing a multi-modal approach, collection of more robust information may be as possible. As an example, even if 2D imagers can perform at a lower cost with higher speed, the 3D imagers have some distinct advantage as the 3D imagers can capture shape information and are more robust to variations in illumination and viewpoint (i.e., so-called "small pose changes"). On the other hand, IR-spectrum sensors may register environmental temperatures and track relative robot-to-human motion by means of superficial temperature of the human body (e.g., face, arms, hands) and a robot arm and tools.

Data Preprocessing

The data preprocessing module 304 may be formed of a number of different sub-modules that are utilized to preprocess different image data from the different imagers 312. As shown, data preprocessing module 304 may include a data calibration module 314a, filtering module 314b, data fusion module 314c, sub-sample module 314d, and localization module 314a. In many cases, prior to identifying features within images, some additional image preprocessing may be applied to the image preprocessing that may include (i) image segmentation, (ii) binarization, (iii) resizing, (iv) normalization, or (v) other image processing techniques, as understood in the art. In some cases, illumination correction may be performed followed by some type of item localization that defines regions-of-interest (ROIs) in the whole image, for example. Each imager 312a-312e may be in communication with more than one of the data pre-processing modules 314a-314e. For example, imager 312b may be in communication with both the filtering module 314b and data fusion module 314c.

In one embodiment, the data calibration module 314a may be configured to provide for 3D stereo camera calibration of imagers 312a and 312b that individually capture 2D images. In another case, the output of imager 312c may be filtered by filtering module 314b (e.g., in order to reduce thermal noise) and the same output of imager 312c may be used by data fusion module 314c along with output from imager 312d in order to perform data fusion (e.g., the resultant image will be a three dimensional image, where at least some of the pixel points, selected with a certain criteria, also have a temperature degree associated therewith). The sub-sampling module 314d may be used to subsample output from the imager 312e, and localization module 314e may perform a localization function on the images produced by the imager 312a to delimitate most probable region-of-interest in the images.

The data pre-processing module 304 may be carefully designed for a monitoring system or environment in which to fit the subsequent classification phase. Some preprocessing algorithms are known to be better than others when a defined learner is adopted. From the pre-processing module 304, preprocessed image data are provided to the feature extraction module 306 for processing by specific modules that are dedicated to extracting features from data types output from each of the different modules 314a-314e.

Feature Extraction

The feature extraction module 306 may be configured to select derived, non-redundant information or features that facilitate a subsequent learning task. The expected improvement of the classification results is due to a reduction of the optical noise normally present in real-world images and also because the new, transformed and reduced data (i.e. the features vectors) is smaller than original images that is formed of many pixels, thereby resulting in a compact representation that reduces the storage and computational requirements of the system.

As shown, there are five feature extraction sub-modules 316a-316e (collectively 316) of the feature extraction module 306. Each of these feature extraction sub-modules 316 may be formed of conventional feature extraction algorithms, such as pattern recognition and image processing, ranging from simple edge or corner detectors to the most complex descriptors, such as the patented scale-invariant feature transform (SIFT), Binary descriptors (BRIEF, ORB, BinBoost . . . ), BOLD (from Datalogic) and Shape Context algorithm (a log-polar histogram of the relative coordinates of neighborhood points). It should be understood that any feature extraction algorithm may be utilized for each of the feature extraction sub-modules 316, as further provided herein.

Since various descriptors or types of features can be used to identify objects or classifications of objects, the feature extraction techniques or algorithms should be selected on the basis of an actual scenario. Feature invariance may also be utilized. For example, a request may be made to determine whether a feature is geometric (invariance to translation, rotation and scale) and/or photometric (invariance to brightness and exposure). In one embodiment, a selection of feature extractors that may be used for machine learning purposes in the environment 200 of FIG. 2 are provided hereinbelow.

The feature extraction sub-module 316a may be configured to perform a 3D optical flow to specify how much each volume voxel (e.g., included in the Cobot) moves between adjacent volumes (e.g., the human). Quantity of 3D motion in terms of relative velocity and associated energy may be derived from the movement of each volume voxel.

The feature extraction sub-module 316b may be configured to perform 2D blob detection (e.g. a simple convolution) on an infrared image to detect regions that differ in brightness (i.e., temperature) compared to surrounding regions. Blob detection is useful in motion tracking of human's hands/head and robot arm/tool.

The feature extraction sub-module 316c may be configured to be performed on a native 3D image fused with infrared information, which provides a mixed depth-threshold and thermal-threshold segmentation to provide for extracting shape information about 3D objects at different temperatures. It should be understood that alternative feature extraction algorithms that are capable of performing the same or similar feature extraction may be utilized.

The feature extraction sub-module 316d may be configured to process a subsampled 2D image that is output from the sub-sampling module 314d. The sub-module 316d may provide for corner detection in order to estimate proximity between distinct objects in a scene captured by imager 312e. It should be understood that alternative algorithms may be utilized to perform the same or similar corner and/or edge detection.

The feature extraction sub-module 316e may be configured to receive and process a native 2D image to perform classical Gabor filtering to detect features typically associated with human body parts, such as faces, hands and legs. In this case, recognition of the various human body parts are not required to be performed by the algorithm. It should be understood that alternative algorithms may be utilized to perform the same or similar detection as Gabor filtering.

Ensemble Learner

In an embodiment, the ensemble learner 308 may be configured with multiple classification modules 318a-318e. Each of the classification modules may be in communication with respective feature extraction sub-modules 316a-316e. The proposed ensemble may be configured to learn multiple different, but complementary meanings of a concept using different supervised learning algorithms (classification) and different training data (the extracted features) received from the same image-based scenario (e.g., robot/human interaction).

It should be noted that while in the standard ensemble methods may be conventionally available, such as Boosting, Bootstrapping, Random Forest, etc., the same identical data may be communicated to different classifiers, as shown in the configuration provided in FIG. 3, only the scene of the interaction between robot and human is the same, but every learner may receive different features coming from the different pre-processing modules 314a-314e, different features extraction sub-modules 316a-316e, and different imagers 312a-312e. It should further be understood that the embodiment provided in FIG. 3 is illustrative, and that if more than five imagers 312 are available, then additional data pre-processing sub-modules and feature extraction sub-modules, and classification modules may be utilized. In an embodiment, a safety system intervention state 322 may be received from a safety PLC or other safety system component for use in predicting, by the ensemble learner 308, whether or not a safety system will be activate as a function of the data captured by the vision system 302.

The mixed modular approach provided in FIG. 3 not only means a greater flexibility for processing images of an environment, but also provides for more reliable results, as different information can be captured and conveyed from different channels of the vision system. Since it is demonstrated by the "no free lunch theorem" that there is no single learning algorithm that is considered the best options for all supervised learning problems, one of the many available algorithms (not necessarily the same) may be chosen for each of the classification modules 318a-318e by taking into account strengths and weaknesses of each classification algorithm. The choice of which classification algorithm to select may be made based on a number of factors, such as:

(1) Specific features selected for the classification;
(2) Available computational resources (embedded device, local server or Cloud-based);
(3) Bias-Variance tradeoff (classification error tolerance versus robustness when trained with different datasets);
(4) Non-linearity degree of the modeling;
(5) Amount of training data;
(6) Dimensionality of training data; and
(7) Noise in training data.

It should be understood that additional and/or alternative criteria for selecting classification algorithms for operating on data extracted from specific feature extraction sub-modules 316a-316e may be used.

Although not an exhaustive list of possible supervised learning algorithms, one possible set of classification or learning algorithms that may be appropriate for classification modules 318a-318e may include the following:

(1) Logistic regression;
(2) Classification Trees;
(3) Bayesian Networks (also the simplest naïve Bayes);
(4) Support Vector Machines (also k-Nearest Neighbors); and
(5) Neural Networks (multilevel perceptron).

It should be understood that the list of possible classification modules 318a-318e are illustrative, and that additional or alternative learning algorithms may be utilized in accordance with the principles provided herein.

After selection of the different algorithms are made for the classification modules 318a-318e along with respective internal structures, training/test datasets, and processes to measure predictive accuracies, the different classifications output from each of the classification modules 318a-318e may be synthesized by combiner module 320. In other words, classifications from the different classification modules or learners 318a-318e (not necessarily of the same type and not necessarily operating on the same data) that capture different relevant aspects of the same interaction are to be reduced to a single classification to produce a predicted classification 310 by the combiner module 320, as further described with regard to FIG. 4.

Figure 4:
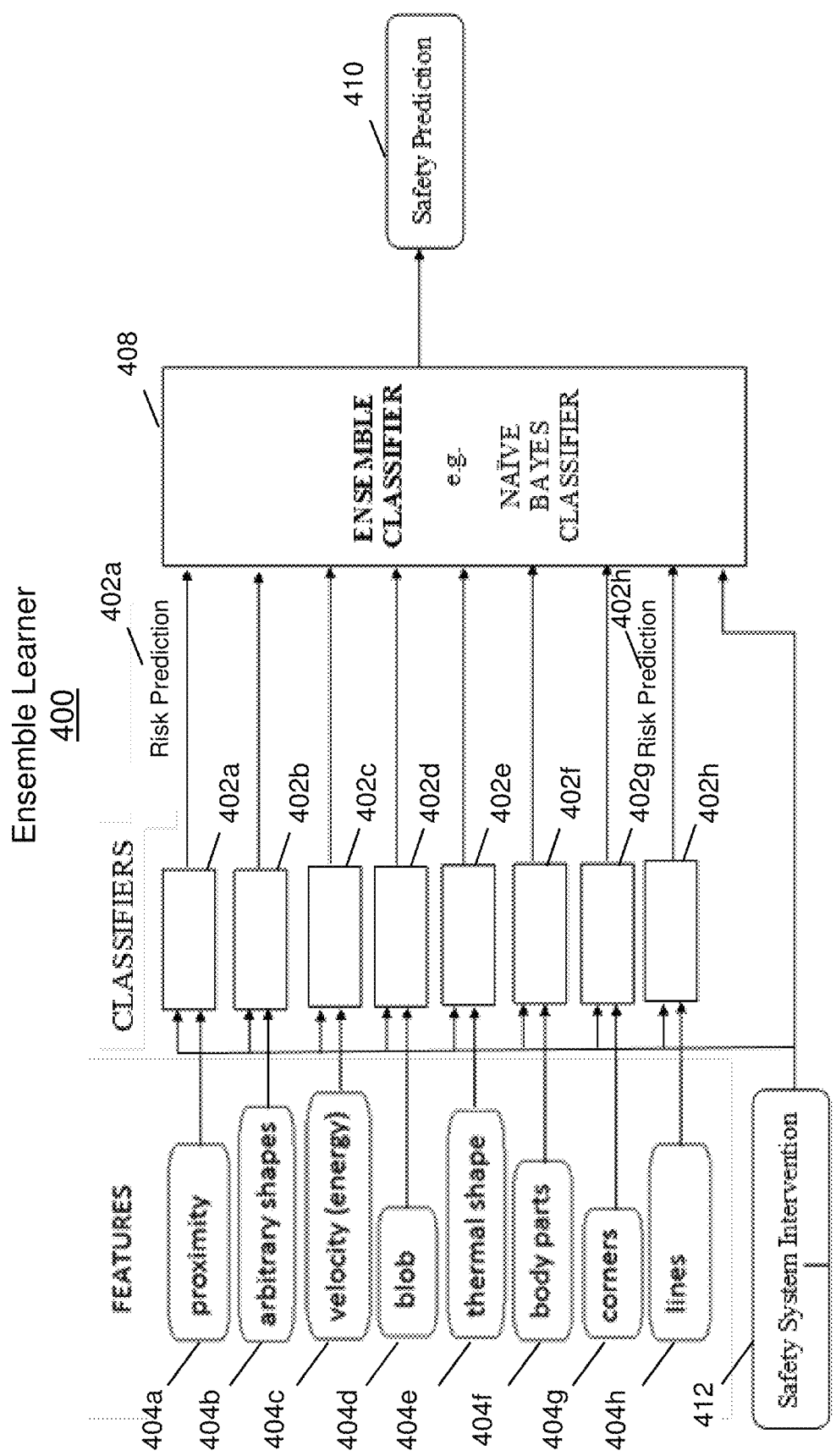
FIG. 4 is an illustration of an illustrative ensemble learner in accordance with the principles described herein.

With regard to FIG. 4, an illustration of an illustrative ensemble learner 400 in accordance with the principles described herein is shown. In this ensemble learner 400, eight classifier modules 402a-402h (collectively 402) are shown for processing eight different features 404a-404h (collectively 404) that are output from eight different feature extraction modules (not shown).

In an embodiment, each of the classifiers modules 402 may classify each of the features 404 into one of two risk classes or predictions 406a-406h (collectively 406) (e.g., "RISK" or "NO RISK"). As an example, classifier modules 402a, 402b, 402d, and 402h may predict a risky interaction, while classifier modules 402c, 402e, 402f, and 402g may predict that there is no interaction risk. From those classifications 406, an ensemble classifier or combiner module 408 may predict a synthesized class or safety prediction 410, such as "Y" (e.g., "Y1=SAFETY ON" or "Y2=SAFETY OFF"). In an embodiment, the ensemble classifier 408 is a Naïve Bayes Classifier. Alternative classifier algorithms may be utilized in accordance with the principles described herein.

As shown, a safety system intervention state 412 that is output by a safety PLC (see safety PLC 122 of FIG. 1A, for example) may be input into each of the classifiers 402 and ensemble classifier 408. The safety system intervention state 410 is indicative of the state or status safety system so as to use such a state in current and further risk predictions by each of the classifiers 402 and 408, as further provided herein. That is, each of the classifiers may use the features 404 and safety system intervention state 412 to generate respective risk predictions 406. The ensemble classifier 408 may utilize the risk predictions 406 and safety system intervention state 412 to output the synthesized class or safety prediction 410. In general, the ensemble learner 400 may have the ability to learn over time as to when a risk of safety system activation is to occur, thereby further improving the overall process and efficiency of the robots and humans operating in an embodiment.

Moreover, it should be noted that the design of the ensemble learner 400 allows for an immediate meaning for the ensemble result or safety prediction 410 as the safety prediction 410 represents a real-time confidence level or probability that given the modeled features 404, the robot-to-robot and/or robot-to-human interactions have been recognized or not as a prediction of an imminent safety activation status before a safety system activation is detected by the safety controller or PLC. Thus, utilizing a multi-channel virtual sensor including the ensemble learner 400, safety may be improved and safety system activations may be reduced, thereby improving overall efficiency of robots operating within an environment.

Naïve Bayes Example

In machine learning, the Naïve Bayes classifier algorithm performs statistical classification based on Bayes' Theorem with the assumption of independence among attribute predictors (i.e., assuming that the information conveyed by a particular feature does not affect the information conveyed by any other feature). The Naïve Bayes classifier machine learning algorithm, which has been studied since the 1950s, is a well-known tool and often used in text classification, spam filtering, and sentiment analysis domains, where the algorithm shows a higher success rate as compared to other machine learning algorithms. The Naïve Bayes algorithm is an appropriate choice for use with a multi-channel virtual sensor, as described herein, due to a few reasons, including being:

(1) easy to build (a table of observed cases called instances or items);
(2) fast to train and fast inference (i.e., the Naïve Bayes algorithm may be used for making predictions in real-time);
(3) being usable for multi-class prediction (i.e., either multiple levels of risk or multiple levels of safety may be introduced);
(4) particularly useful for very large data sets based on discrete features or predictors; and
(5) very robust against data variance (no fine tuning needed for predictors).

With regard to FIG. 5, a listing of Naïve Bayes formulas for use as a reference herein below are shown. An illustrative practical example that is helpful to understand the simplicity and the effectiveness of the processes described is also provided hereinbelow using the Naïve Bayes formulas.

TABLE 1 represents a dataset of eight observed instances or items, where the target attribute "Y=SAFETY," which may assume binary values, ON=1 and OFF=0, has been registered after actual occurrence along with the related predictor attributes corresponding to features X1 . . . X4, where binary values, RISK=1 and NO RISK=0, are assumed. In the case of multiple attributes (in the simplest case of using binary class predictors, but which could also be multi-class predictors), the number of observations grows exponentially. For example, for 30 predictors of a binary values, there would be 2^30 possible rows in the table, which is very difficult to observe to an acceptable extent, and which is why prediction is used.

TABLE 1

DATASET TABLE

| ITEM ID | TARGET Y = SAFETY | PREDICTOR1 X1 | PREDICTOR2 X2 | PREDICTOR3 X3 | PREDICTOR4 X4 |
|---|---|---|---|---|---|
| 1 | 0 | 0 | 0 | 1 | 0 |
| 2 | 0 | 1 | 0 | 0 | 0 |
| 3 | 0 | 0 | 1 | 0 | 0 |
| 4 | 0 | 0 | 0 | 1 | 1 |
| 5 | 1 | 1 | 1 | 1 | 1 |
| 6 | 1 | 1 | 1 | 1 | 0 |
| 7 | 0 | 0 | 0 | 0 | 0 |
| 8 | 1 | 0 | 0 | 1 | 0 |

TABLE 2 represents the derived frequency table for each predictor attribute against the target. It should be understood that it is simply a matter of counting as there is no need to utilize any probability distribution.

TABLE 2

FREQUENCY TABLE

| | | PREDICTOR1 | | PREDICTOR2 | | PREDICTOR3 | | PREDICTOR4 | |
|---|---|---|---|---|---|---|---|---|---|
| | | X1 = 0 | X1 = 1 | X2 = 0 | X2 = 1 | X3 = 0 | X3 = 1 | X4 = 0 | X4 = 1 |
| SAFETY | Y = 0 (5) | 4 | 1 | 4 | 1 | 3 | 2 | 4 | 1 |
| | Y = 1 (3) | 2 | 1 | 1 | 2 | 0 | 3 | 2 | 1 |

TABLE 3 represents a likelihood table, where to avoid the zero-frequency problem, the number 1 is added to the count for every attribute value-class combination (Laplace estimator) when an attribute value (see Y=1) does not occur with every class value (see X3=0).

TABLE 3

LIKELIHOOD TABLE

| | | PREDICTOR1 | | PREDICTOR2 | | PREDICTOR3 | | PREDICTOR4 | |
|---|---|---|---|---|---|---|---|---|---|
| | | X1 = 0 | X1 = 1 | X2 = 0 | X2 = 1 | X3 = 0 | X3 = 1 | X4 = 0 | X4 = 1 |
| SAFETY | Y = 0 (5/8) | 4/5 | 1/5 | 4/5 | 1/5 | 3/5 | 2/5 | 4/5 | 1/5 |
| | Y = 1 (3/8) | 2/3 | 1/3 | 1/3 | 2/3 | 0/3 | 3/3 | 2/3 | 1/3 |

TABLE 4 represents a newly observed set of predictors from which an extraction and measurement of the most probable value of the unknown target SAFETY is performed.

TABLE 4

NEW ITEM TABLE

| ITEM ID | TARGET Y = SAFETY | PREDICTOR1 X1 | PREDICTOR2 X2 | PREDICTOR3 X3 | PREDICTOR4 X4 |
|---|---|---|---|---|---|
| 9 | ??? | 1 | 0 | 1 | 0 |

From here, the Naïve Bayesian formulas of FIG. 5 may be used to compute a posterior probability for each class ($Y=1$ and $Y=0$, or Y1 and Y2 respectively), predicting as outcome the class with the highest posterior probability. It is understood that the attribute prior probability is a constant that scales both posteriors equally, and does not affect classification so can be ignored in computations.

$$P(Y=0|X)=P(Y=0)*P(X1=1|Y=0)*P(X2=0|Y=0)*P(X3=1|Y=0)*P(X4=0|Y=0)$$

$$P(Y=0|X)=5/8*4/5*4/5*2/5*4/5=0.128$$

$$P(Y=1|X)=P(Y=1)*P(X1=1|Y=1)*P(X2=0|Y=1)*P(X3=1|Y=1)*P(X4=0|Y=1)$$

$$P(Y=1|X)=3/8*2/3*1/3*3/3*2/3=0.055$$

The final posterior probabilities can be standardized between 0 and 1 using the following:

$$P(Y=0|X)=0.128/(0.128+0.055)=0.69$$

$$P(Y=1|X)=0.055/(0.128+0.055)=0.31$$

This standardization or normalization allows for an immediate meaning for the ensemble result: as the standardized values represent a percentage from 0% to 100% that can be interpreted as a raw confidence degree (or probability of prediction) that given the modeled features (i.e., the robot-to-robot and robot-to-human interactions) are predicted to lead or not lead to a safety activation (i.e., triggered by the safety controller).

Figure 6:
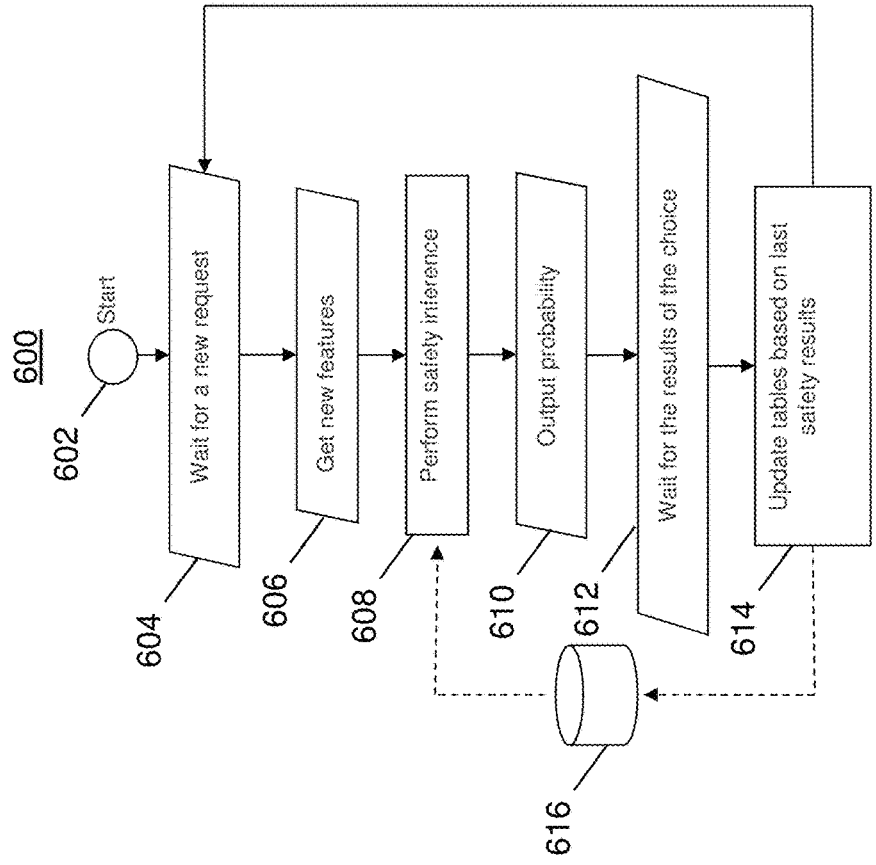
FIG. 6 is a flow diagram of an illustrative process for performing an interaction classification by extracting different features in order to classify interactions to reduce risk.

With regard to FIG. 6, a flow diagram of an illustrative process 600 for performing an interaction classification by extracting different features in order to classify a single aspect of the risk is shown. The process 600 may start at step 602 after deploying a heterogeneous distributed vision system in an environment, such as a warehouse. By using a heterogeneous distributed vision system, it is matter of performing interaction classification by extracting different features in order to classify a single aspect of the risk of robot-to-human or robot-to-robot interaction. As previously described, in a typical application, the process 600 may be used to help a robot controller to make decisions based on two or more options and/or provide a notification to humans about a potential upcoming interaction with a robot.

For each possible decision to be made, an historical database (e.g., one or more tables of a Naïve Bayes classifier) may be maintained inside an ensemble classifier. The database may correlate the results of the decision with a given set of features (e.g., safety condition triggered by the safety controller or PLC).

At step 604, the process 600 waits for a new request to be made. Each time a decision is to be made, two steps may be performed, including at step 606, a first step where the ensemble classifier may utilize the current features so as to compute a risk probability of each choice based on its historical database at step 608. At step 610, the probability (i.e., a predicted value) may be output to be used by a control PLC as "expert information" to decide which action to perform. In an embodiment, the same probability information may be used by other clients to communicate warnings or notices to an operator or other intelligent system(s).

At step 612, a second step may be made, where the control PLC that made a decision communicates the decision to the classifier along with any safety issues that resulted from the decision. Based on the information (i.e., the decision and safety issues that resulted therefrom), the classifier may update at step 614 an historical database 616 by updating a row or adding a new row or record in the database 616 so that in the event of new requests, new predicted values may increase in preciseness.

One method for safely operating robots in an environment may include receiving sensed data from a set of heterogeneous sensors in the environment related to humans and robots operating within the environment. The robots may be slowed or stopped in the event of detecting a potential interaction with another robot or human. A probability that a safety system will activate as a function of the received sensed data may be determined, and an output signal to cause at least one of a notification to alert a human or a control command to alter planned movement of a robot, thereby increasing safety and efficiency of operations of the robots may be generated. In an embodiment, determining a probability may include (i) pre-processing the sensed data to generate preprocessed sensed data, (ii) extracting features from the preprocessed sensed data so as to generate extracted feature data, (iii) classifying extracted feature data to generate risk predictions indicative of a safety system activation, and (iv) classifying the risk predictions to generate an overall safety prediction that defines a probability of activation of a safety system in the area being monitored.

The process may further include sensing the sensed data and preprocessing the sensed data at an input sensor prior to communicating the preprocessed sensed data to have features extracted therefrom. The process may further include pre-processing a first set of input data from a first input sensor different from pre-processing a second set of input data from a second input sensor. Classifying the risk predictions may include classifying the risk predictions using a Naïve Bayes classifier. The process may further include utilizing a safety signal from a safety programmable logic controller (PLC) in classifying the sensed data. Receiving sensed data may include receiving optical signals. Generating an output signal may include generating an output signal that causes an audible and/or illumination signal to be generated in advance of the robot encountering the human. The process may further include preprocessing, by an input sensor, the sensed data generated by the input sensor.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A system for safely operating robots in an environment, said system comprising:
    a set of heterogeneous input sensors configured to generate sensed data related to humans and robots operating within the environment, the set of heterogeneous input sensors positioned off-board the robots;
    one or more safety systems being executed by the respective robots, and configured to slow or stop the robots in the event of the one or more safety systems detecting a potential interaction with another robot or human, the one or more safety systems including one or more input sensors each being different from the set of heterogeneous input sensors; and
    at least one processor in communication with the set of heterogeneous input sensors, and configured to:
        determine a probability that a safety system will activate as a function of the sensed data generated by at least one of the heterogeneous input sensors;
        preprocess, using a plurality using a plurality of data pre-processor sub-modules with at least two being different from one another, the sensed data by one or more of the input sensors to generate preprocessed sensed data;
        extract features, using a plurality of feature extraction sub-modules with at least two being different from one another, from the preprocessed sensed data so as to generate extracted feature data;
        classify, using a plurality of classifier sub-modules with at least two being different from one another, the extracted feature data to generate classified risk predictions indicative of a safety system activation;
        generate, using an ensemble classifier, an overall safety prediction that defines a probability of activation of a safety system in the area being monitored by the input sensors based on the classified risk predictions, the overall safety prediction being generated by executing a supervised learning algorithm; and generate an output signal to cause at least one of a notification to alert a human or a control command to alter planned movement of a robot to avoid activation of the safety system of the robot that causes the robot to slow down.

2. The system according to claim 1, wherein at least a portion of the input sensors include a processor configured to preprocess the sensed data.

3. The system according to claim 1, wherein the processor is configured to pre-process the input data by utilizing the plurality of different data preprocessor sub-modules, and the sensed data received by the at least one of the data preprocessing sub-modules is a different format from other sensed data receive by the other data preprocessing sub-modules.

4. The system according to claim 1, wherein the at least one processor, in generating an overall safety prediction, is configured to execute a Naïve Bayes classifier.

5. The system according to claim 1, further comprising a safety programmable logic controller (PLC) configured to generate a safety signal to alter operation of a robot, and wherein the at least one processor is in communication with the safety PLC, and configured to utilize the safety signal to classify the sensed data.

6. The system according to claim 1, wherein the heterogeneous input sensors include optical cameras.

7. The system according to claim 1, wherein the robots include mobile robots inclusive of the one or more safety systems with sensors, and wherein the one or more safety systems are configured to avoid collisions with other robots, humans, and objects by slowing or stopping the respective robots.

8. The system according to claim 1, wherein at least one input sensor of the set of heterogeneous input sensors is configured to preprocess, by executing a data preprocessor, the sensed data generated by the respective input sensor.

9. The system according to claim 8, wherein the at least one input sensor is further configured to extract features from the preprocessed sensed data so as to generate extracted feature data.

10. The system according to claim 9, wherein the at least one input sensor is further configured to classify the extracted feature data to generate risk predictions indicative of a safety system activation.

11. A method for safely operating robots in an environment, the method comprising:
receiving sensed data from a set of heterogeneous sensors in the environment related to humans and robots operating within the environment, at least one of the heterogeneous input sensors positioned off-board the robots;
slowing or stopping the robots, by one or more safety systems (i) being respectively executed by the robots and (ii) including input one or more sensors that are different from the set of heterogeneous input sensors, in the event of the robot detecting a potential interaction with another robot or human;
determining a probability that a safety system will activate as a function of the received sensed data from at least one of the heterogeneous sensors;
pre-processing, using a plurality of data pre-processor sub-modules with at least two being different from one another, the sensed data to generate preprocessed sensed data;
extracting features, using a plurality of feature extraction sub-modules with at least two being different from one another, from the preprocessed sensed data so as to generate extracted feature data;
classifying, using a plurality of classifier sub-modules with at least two being different from one another, extracted feature data to generate classified risk predictions indicative of a safety system activation; and
generating, using an ensemble classifier, an overall safety prediction that defines a probability of activation of a safety system in the area being monitored by the input sensors based on the classified risk predictions, the overall safety prediction being generated by executing a supervised learning algorithm; and
generating an output signal to cause at least one of a notification to alert a human or a control command to alter planned movement of a robot to avoid activation of the safety system of the robot that causes the robot to slow down.

12. The method according to claim 11, further comprising sensing the sensed data and preprocessing the sensed data at an input sensor prior to communicating the preprocessed sensed data to have features extracted therefrom.

13. The method according to claim 11, further comprising pre-processing a first set of input data from a first input sensor different from pre-processing a second set of input data from a second input sensor.

14. The method according to claim 11, wherein classifying the risk predictions includes classifying the risk predictions using a Naïve Bayes classifier.

15. The method according to claim 11, further comprising utilizing a safety signal from a safety programmable logic controller (PLC) in classifying the sensed data.

16. The method according to claim 11, wherein receiving sensed data includes receiving optical signals.

17. The method according to claim 11, wherein generating an output signal includes generating an output signal that causes an audible and/or illumination signal to be generated in advance of the robot encountering the human.

18. The method according to claim 11, further comprising preprocessing, by an input sensor, the sensed data generated by the input sensor.

19. The method according to claim 11, wherein classifying the overall safety prediction includes classifying the overall safety prediction by executing a Naïve Bayes classifier.

* * * * *